Figure 2:
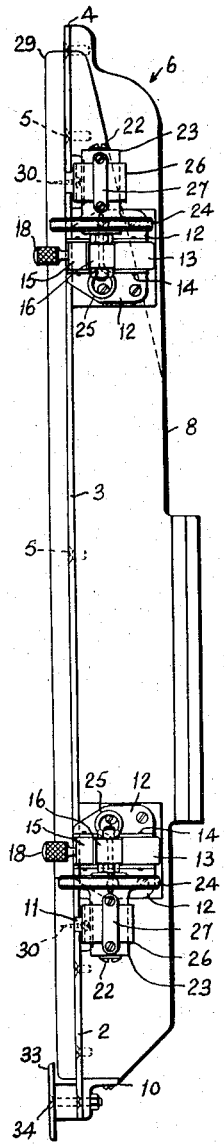

Oct. 11, 1960 P. J. PACKMAN 2,955,697
APPARATUS FOR GUIDING MOVING ARTICLES
Filed Dec. 24, 1957 3 Sheets-Sheet 1

Inventor:
Percival James Packman
by: Michael S. Striker
Attorney

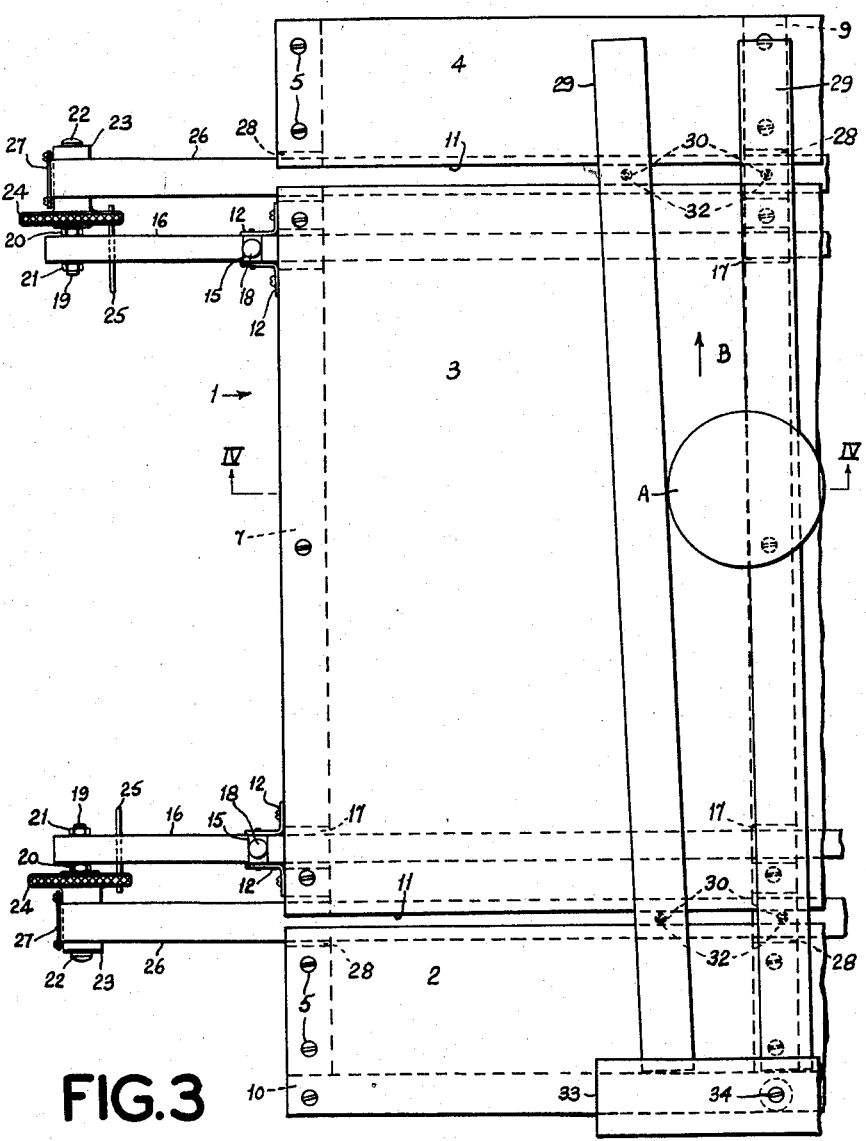

Oct. 11, 1960 P. J. PACKMAN 2,955,697
APPARATUS FOR GUIDING MOVING ARTICLES
Filed Dec. 24, 1957 3 Sheets-Sheet 3

Inventor:
Percival James Packman
by: Michael S. Striker
Attorney

United States Patent Office 2,955,697
Patented Oct. 11, 1960

2,955,697

APPARATUS FOR GUIDING MOVING ARTICLES

Percival James Packman, Twyford, England, assignor, by mesne assignments, to Baker Perkins Limited, Westwood Works, England, a British company Filed Dec. 24, 1957, Ser. No. 705,058

Claims priority, application Great Britain Jan. 2, 1957

13 Claims. (Cl. 198—34)

The present invention relates to apparatus for guiding moving articles. In particular, but not exclusively, the invention relates to apparatus for guiding a large number of flat articles, such as biscuits, during conveyance of the articles from one location to another.

In the manufacture of biscuits by mass production methods it is often necessary to convey the biscuits from one location to another employing flat band conveyors, the biscuits being arranged on the conveyors in a number of rows extending generally in the direction of advance of the conveyors. In such conveying systems the need frequently arises for the rows of biscuits to be guided by guiding apparatus as they are being transferred from the delivery end of one conveyor to a subsequent conveyor. For this purpose it is known to employ a dribble board, by which we mean a device comprising a surface which is downwardly inclined in the direction of advance of the biscuits and which provides a plurality of substantially parallel guideways each of which is adapted to guide one of the rows of biscuits in its travel down said inclined surface and to tilt the individual biscuits transversely of their direction of advance so that as a biscuit passes down the guideway it is urged by gravity transversely of its direction of advance and bears against one side of the guideway. Conventional dribble boards are formed from sheet metal, each of said guideways comprising a plane surface, which is inclined both in the direction of advance of the biscuits and transversely of this direction, upon which the biscuits slide. A disadvantage of such a dribble board is that the position of said guideways relative to one another cannot be varied. This means that if the spacing apart of the rows of biscuits on the conveyor discharging on to the dribble board is altered, a new dribble board has to be installed in which the spacing apart of the guideways is equal to the new spacing apart of the rows of biscuits. Again, owing to the parallel disposition of the guideways, the conventional dribble board does not provide the possibility of varying the transverse spacing of the rows of biscuits in their passage down the dribble board. Another disadvantage of the conventional dribble board is that there is considerable frictional resistance between the biscuits and the plane inclined surfaces of the guideways.

The main object of the present invention is to provide an article guiding apparatus which does not have the disadvantages mentioned above.

According to the invention an article guiding apparatus comprises a stationary article-receiving surface, means mounting said surface so that it inclines downwardly from an article-receiving end to an article-discharging end, at least two guiding members on said surface, one of said guiding members being adapted to tilt articles substantially transversely of their direction of advance down said surface so that the articles are urged in said transverse direction under the influence of gravity to bear against a side of the adjacent guiding member, and means for adjusting the transverse spacing of said guiding members on said surface.

Preferably each guiding member consists of a thin narrow guide which extends from a point adjacent to the article-receiving end of said surface to a point adjacent to the article-discharging end of said surface. Preferably each of these guides comprises substantially vertical sides and a convex upper surface.

Preferably the means for adjusting the spacing apart of said guiding members comprises one or more extensible members to which the guiding members are connected and means for varying the length of each extensible member for the purpose of varying the spacing apart of the points of connection of the guiding members to the extensible member.

The extensible member or members may take the form of a helical spring, a lazy tongs or telescopically arranged screw-threaded members. Preferably, however, each extensible member consists of an elastic strip, for example a strip of rubber of rectangular section.

In the handling of large numbers of articles employing a number of conveying surfaces, for example band conveyors, there is usually a tendency, over a period of time, for the articles to be displaced bodily in the transverse direction with respect to the direction of advance of the conveying surfaces. This bodily displacement of the articles, which usually is a gradual process and which is caused by wandering of the conveying surfaces from side to side over a period of time, complicates the problem of feeding articles to guiding apparatus in accordance with the invention. It is therefore a subsidiary object of this invention to provide the guiding apparatus with means whereby the guiding members are caused automatically to take up positions to receive articles fed to the guiding apparatus.

Figure 1:
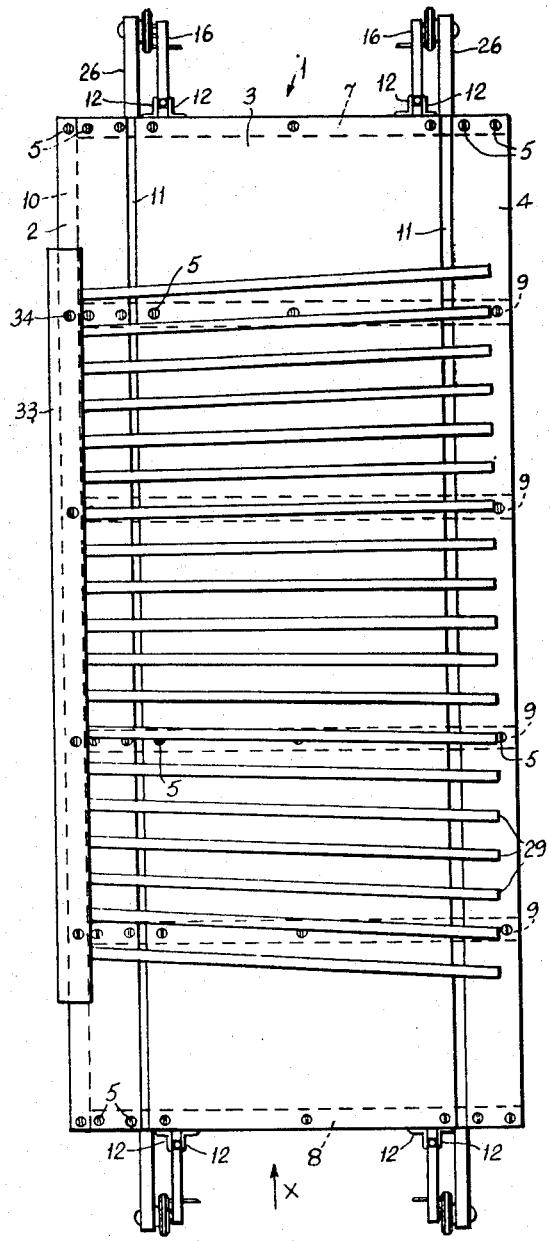
Figure 5:
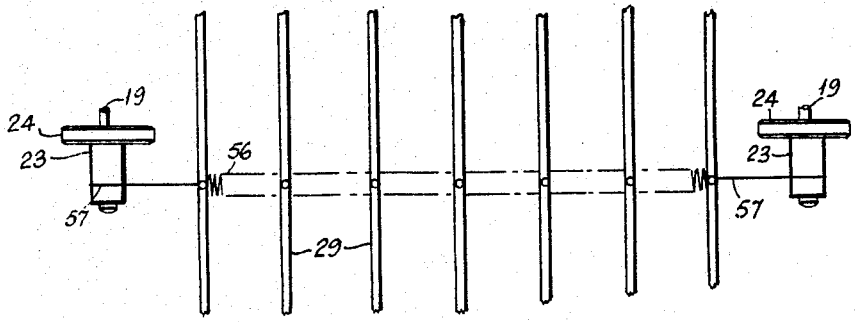
Figure 6:
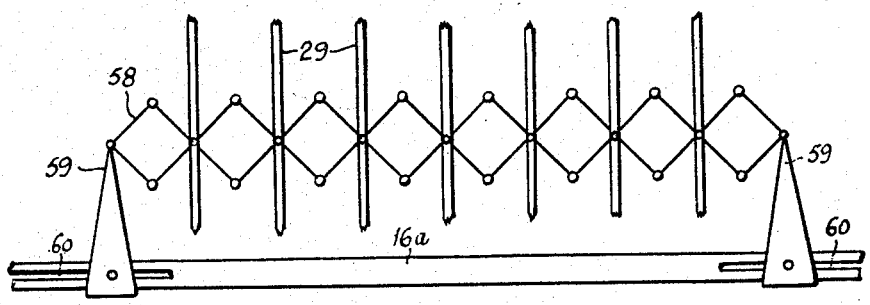

The invention will now be described in greater detail with reference to the accompanying drawings, in which:

Figure 1 is a plan of one form of guiding apparatus in accordance with the invention, Figure 2 is a view in the direction of the arrow X in Figure 1, on an enlarged scale, Figure 3 shows a part of Figure 1 on an enlarged scale, Figure 4 is a section along the line IV—IV of Figure 3 of the supporting surface, frame members and guiding members of the apparatus, Figures 5 and 6 show other forms of extensible members for use in guiding apparatus according to the invention.

The guiding apparatus illustrated in Figures 1 to 4 is intended particularly for the handling of up to eighteen rows of flat articles, such as biscuits. The stationary supporting surface 1 of the apparatus is rectangular and is formed by three substantially plane thin rectangular sheets 2, 3 and 4 made of any suitable material, such as wood, hardboard, synthetic resin or metal. These sheets are secured by screws 5 to a frame, generally designated 6, which is formed by two side channels 7, 8, four intermediate channels 9 and an angle 10. The sheets 2, 3 and 4 are secured to the frame 6 in spaced parallel relationship with their upper surfaces in substantially the same plane and with narrow gaps 11 between adjacent sheets. On the outwardly directed surface of each of the side channels 7 and 8 are mounted two pairs of brackets 12, these brackets being arranged near to the gaps 11. Each pair of brackets 12 supports a roller 13 which is rotatably mounted between the brackets on a shaft 14 secured to the brackets near their lower ends. A distance piece 15 is secured between each pair of brackets 12 near their upper ends. Two bars 16 of square section are supported under the sheet 3 parallel to the gaps 11 by means of the brackets 12, each bar 16 being associated with a pair of brackets 12 mounted on the channel 7 and another pair of brackets 12 mounton the channel 8. These bars 16, which may be of wood or metal, extend a short distance beyond the side channels 7, 8 and are received in the brackets 12 between the rollers 13 and the distance pieces 15. Suitable recesses 17 are provided in the channels 7, 8 and 9 for the passage of the bars 16. Each distance piece 15 is provided with a locking screw 18 which can be screwed through the distance piece to engage the bar 16 and lock the latter against movement relative to its associated brackets 12. If, on the other hand, the screws 18 are loosened so that they no longer engage the bars 16, the latter can slide in the brackets 12 on the rollers 13 in a direction parallel to the axes of the gaps 11. Each bar 16 is bored adjacent to each of its ends for the reception of bolts 19 which are secured to the bar by means of nuts 20 and 21. On each of the bolts 19 a sleeve 23 is rotatably mounted between the nut 20 and the bolt head 22. Each sleeve 23 is provided with a circular flange 24 to facilitate manual rotation of the sleeve on its bolt 19. The peripheral edge of each flange 24 may be knurled (as indicated in Figure 3 only). Each sleeve 23 may be locked against rotation on its bolt 19 by means of a removable pin 25 which passes through a suitable hole in the bar 16 and enters one of a series of holes drilled through the flange 24 near its peripheral edge. Two elastic strips 26, for example strips of rubber having a width of ¾" and a thickness of 1/16", pass under the supporting surface 1 parallel to and immediately below the gaps 11, the ends of the elastic strips being clamped by plates 27 to the sleeve 23 which are arranged to be in alignment with the gaps 11. Suitable recesses 28 are formed in the channels 7, 8 and 9 for the passage of the strips 26.

From the description so far it will be appreciated that rotation of one of the sleeves 23, or simultaneous rotation of the two sleeves 23 associated with one strip 26 in opposite directions, or simultaneous rotation of the two sleeves 23 associated with one strip 26 in the same direction but by different amounts, will cause either an increase or decrease in length of the strip 26 associated with the rotated sleeve or sleeves. On the other hand, if both sleeves 23 associated with one elastic strip 26 are rotated the same amount in the same direction the strip will be moved in the direction of the axis of the gap 11 without any change in its length. Movement of the elastic strips 26 in this way may also be effected by slackening the screws 18 and moving the bars 16 relative to the brackets 12 in the direction of the axes of the gaps 11.

Nineteen substantially straight thin guides 29, preferably made of wood, rest on the upper surface of the sheets 2, 3 and 4. These guides have a plane lower surface, vertical sides 29a, 29b and a slightly convex upper surface 29c. The side 29a is higher than the side 29b so that the guides have a tapered cross-section, as shown in Figure 4. Each guide 29 lies substantially at right angles to the gaps 11 and extends from a point near to the angle 10 to a point near the edge of the supporting surface 1 remote from the angle 10, passing over both of the gaps 11. The guides 29 are connected to both of the elastic strips 26 by means of screws 30 passing upwardly through the elastic strips 26 and the gaps 11 into the guides. To this end nineteen holes 32 are punched in each of the elastic strips 26 for the passage of the screws 30, these holes 32 being spaced apart equidistantly in the two strips when both strips are in the unstretched state. The screws 30 are not tightened on to the elastic strips 26 with the result that the guides 29 are able to pivot relative to the elastic strip.

By rotating the sleeves 23 the pitch distance of the holes 32 in each elastic strip 26 can be varied, but in each strip the holes 32 will still be spaced apart substantially equidistantly. The pitch distance of the holes 32 can of course be varied in the two strips independently of one another. It will be appreciated, therefore, that by rotating the sleeve 23 it is possible to effect a rapid and, simultaneous adjustment of the spacing apart of all the guiding strips 29, either at one end or at both ends of the latter. Apart from separating or closing together the guides 29, it is of course possible to adjust them in other ways. For example one or both ends of the guides 29 may be displaced bodily in the direction of the axis of the gap 11 with or without alteration of the spacing apart of the guides. Again, the guides 29 may be made to converge or diverge from one end of the supporting surface 1 to the other.

The apparatus shown in Figures 1 to 4 may be employed in exactly the same way as a conventional dribble board for the handling of flat articles, such as biscuits. In this case the screws 18 are tightened down on to the bars 16 to prevent movement of the latter relative to the brackets 12. The spacing apart of the guides 29 is then adjusted by means of the sleeves 23 to suit the dimensions of the articles being handled and the sleeves 23 are then locked against rotation by means of the pins 25. It will be appreciated that the spacing apart of the guides 29 must not exceed the minimum transverse dimension of the articles being handled. An article, such as that indicated at A in Figures 3 and 4, will then rest at one edge on the support 1 and on the surface 29c of one guide 29. In other words the article is tilted transversely of its direction of advance along the apparatus, indicated by the arrow B. As a result the article is urged transversely by gravity against the vertical side 29a of the adjacent guide 29. The rounded upper surface 29c of the guides 29 facilitates this transverse movement of the articles. The above described guiding apparatus presents considerably less frictional resistance to the passage of articles than a conventional dribble board.

When the apparatus is employed to guide thin flat articles, such as biscuits, a strip 33 preferably is arranged along the edge of the supporting surface 1 at which the articles enter the apparatus. This strip is arranged at such a height above the supporting surface 1 that it prevents articles passing into the apparatus on top of one another. The strip 33 is secured to the angle 10 by means of screws 34. If the screws 18 associated with the bar 16 lying adjacent to the article receiving end of the support 1 are loosened, it will be appreciated that the position of this bar 16 may be adjusted manually from time to time so that the guides 29 are correctly positioned to receive the articles.

The rows of biscuits 40 on the conveyor 41 may be close together or the biscuits may even be arranged in honeycomb pattern (i.e. so that the transverse spacing of the rows is less than the diameter of the biscuits). Such an arrangement of the biscuits makes subsequent handling of the rows more difficult. Guiding apparatus according to the invention may be employed to effect a spreading apart of such rows of biscuits. This may be achieved by adjusting the guides 29 so that they diverge. The amount of divergence of the guides 29 is readily adjustable, as described above, which is a considerable advantage of guiding apparatus according to the invention in comparison with conventional dribble boards.

The invention is not, of course, limited to the particular forms of apparatus described in detail above. In particular elastic strip need not be employed for the extensible member or members. Figures 5 and 6 show two other forms of extensible members. In Figure 5 a helical spring 56 is employed as the extensible member. The ends of the spring 56, in the two outermost guides 29, would be connected by wires 57 or the like to the sleeves 23, the latter being clamped to the sleeves 23 in the same way as the strips 26 of the apparatus shown in Figures 1 to 4. In Figure 6 a lazy tongs 58 is employed as the extensible member. In this case the ends of the lazy tongs would be secured to members 59 slidably mounted in slots 60 in a bar 16a, which bar serves the same purpose as the bar 16 of the apparatus of Figures 1 to 4. Suitable means would be provided for locking the members 59 to the bar 16a.

Again, the guides 29 need not have the tapered section shown in Figure 4. Other suitable sections for the guides are semi-circular or trapezoidal. In the latter case it is preferred to make the upper surface of the guides convex.

What I claim is:

1. Article guiding apparatus comprising a member having a stationary article receiving surface, means mounting said member so that said surface is inclined downwardly from an article receiving end to an article discharging end, a plurality of elongate guiding members located on said surface, means connected to the higher ends of said guiding members and supporting said guiding members for movement relative to each other, an elastic strip connected to the lower ends of said guiding members, and means for varying the length of said elastic strip for simultaneously moving the lower ends of said guiding members toward and away from each other.

2. Article guiding apparatus comprising a member having a stationary article receiving surface, means mounting said member so that said surface is inclined downwardly from an article receiving end to an article discharging end, a plurality of elongate guiding members located on said surface, means connected to the higher ends of said guiding members and supporting said guiding members for movement relative to each other, a helical spring connected to the lower ends of said guiding members, and means for varying the length of said helical spring for simultaneously moving the lower ends of said guiding members toward and away from each other.

3. Article guiding apparatus comprising a member having a stationary article receiving surface, means mounting said member so that said surface is inclined downwardly from an article receiving end to an article discharging end, a plurality of elongated guiding members located on said surface, means connected to the higher ends of said guiding members and supporting said guiding members for movement relative to each other, an extensible member consisting of a lazy tongs connected to the lower ends of said guiding members, and means for varying the length of said extensible member for simultaneously moving the lower ends of said guiding members toward and away from each other.

4. Article guiding apparatus comprising a member having a stationary article receiving surface, means mounting said member so that its surface is inclined downwardly from an article receiving end to an article discharging end, a plurality of elongate guiding members located on said surface, means connected to the higher ends of said guiding members and supporting said guiding members for movement relative to each other, an extensible member connected to the lower ends of said guiding members, means for varying the length of said extensible member for simultaneously moving said lower ends of said guiding members toward and away from each other, a bar supporting said extensible member, and means for mounting said bar for sliding movement relative to said surface.

5. Article guiding apparatus comprising a member having a stationary article receiving surface, means mounting said member so that its surface is inclined downwardly from an article receiving end to an article discharging end, a plurality of elongate guiding members located on said surface, means connected to the higher ends of said guiding members and supporting said guiding members for movement relative to each other, and an extensible transverse member connected to the lower ends of said guiding members, means for varying the length of said extensible member for simultaneously moving said lower ends of said guiding members toward and away from one another, a bar supporting said extensible member, means for mounting said bar for sliding movement transverse to said guiding members, and means for locking said bar relative to said surface.

6. Article guiding apparatus comprising a member having a stationary article receiving surface, means mounting said member so that its surface is inclined downwardly from an article receiving end to an article discharging end, a plurality of elongate guiding members, each in the form of a thin narrow guide located on said surface and extending from a point adjacent to the article receiving end of said surface to a point adjacent to the article discharging end of said surface, said guiding member comprising substantially vertical sides one of which is higher than the other and a convex upper face, means connected to the higher ends of said guiding members and supporting said guiding members for movement relative to each other, and an extensible member connected to the lower ends of said guiding members, and means for varying the length of said extensible member for simultaneously moving said lower ends of said guiding members toward and away from one another.

7. Article guiding apparatus comprising a member having a stationary article receiving surface, means mounting said member so that its surface is inclined downwardly from an article receiving end to an article discharging end, a plurality of elongate guiding members located on said surface, an elastic strip connected to the higher ends of said guiding members, means for varying the length of said elastic strip for simultaneously moving the higher ends of said guiding members toward and away from each other, a second elastic strip connected to the lower ends of said guiding members, and means for varying the length of said second elastic strip for simultaneously moving the lower ends of said guiding members toward and away from each other.

8. Article guiding apparatus comprising a member having a stationary article receiving surface, means mounting said member so that its surface is inclined downwardly from an article receiving end to an article discharging end, a plurality of elongate guiding members located on said surface, a helical spring connected to the higher ends of said guiding members, means for varying the length of said helical spring for simultaneously moving the higher ends of said guiding members toward and away from each other, a second helical spring connected to the lower ends of said guiding members, and means for varying the length of said second helical spring for simultaneously moving the lower ends of said guiding members toward and away from each other.

9. Article guiding apparatus comprising a member having a stationary article receiving surface, means mounting said members so that its surface is inclined downwardly from an article receiving end to an article discharging end, a plurality of elongate guiding members located on said surface, an extensible member consisting of a lazy tongs connected to the higher ends of said guiding members, means for varying the length of said extensible member for simultaneously moving the higher ends of said guiding members toward and away from each other, a second extensible member consisting of a lazy tongs connected to the lower ends of said guiding members, and means for varying the length of said second extensible member for simultaneously moving the lower ends of said guiding members toward and away from each other.

10. Article guiding apparatus comprising a member having a stationary article receiving surface, means mounting said member so that its surface is inclined downwardly from an article receiving end to an article discharging end, a plurality of elongate guiding members located on said surface, a first extensible member connected to the higher ends of said guiding members; means for varying the length of said extensible member for simultaneously moving said higher ends of said guiding members towards and away from each other, a second extensible member connected to the lower ends of said guiding members, means for varying the length of said second extensible member for simultaneously moving said lower ends of said guiding members towards and away from each other, and a bar supporting each extensible member with means for mounting each bar for sliding movement relative to said surface in a direction substantially transversely of the direction of advance of the articles down said surface.

11. Article guiding apparatus comprising a member having a stationary article receiving surface, means mounting said member so that its surface is inclined downwardly from an article receiving end to an article discharging end, a plurality of elongate guiding members located on said surface, a first extensible member connected to the higher ends of said guiding members, means for varying the length of said extensible member for simultaneously moving the higher ends of said guiding members towards and away from each other, a second extensible member connected to the lower ends of said guiding members, means for varying the length of said second extensible member for simultaneously moving said lower ends of said guiding members towards and away from each other, a bar supporting each extensible member with means for mounting each bar for sliding movement relative to said surface in a direction substantially transversely of the direction of advance of the articles down said surface, and means for locking each said bar relative to said surface.

12. Article guiding apparatus comprising a member having a stationary article receiving surface, means mounting said member so that its surface is inclined downwardly from an article receiving end to an article discharging end, a plurality of elongate guiding members, each in the form of a thin narrow guide located on said surface and extending from a point adjacent to the article receiving end of said surface to a point adjacent to the article discharging end of said surface, each said guide comprising substantially vertical sides one of which is higher than the other and a convex upper face, a first extensible member connected to the higher ends of said guiding members, means for varying the length of said extensible member for simultaneously moving said higher ends of said guiding members towards and away from each other, a second extensible member connected to the lower ends of said guiding members, and means for varying the length of said second extensible member for simultaneously moving said lower ends of said guiding members towards and away from each other.

13. Article guiding apparatus comprising a member having a stationary article receiving surface, means mounting said member so that it is inclined downwardly from an article receiving end to an article discharging end, at least two guiding members located on said surface, one of said guiding members being adapted to tilt articles substantially transversely of their direction of advance down said surface so that articles are urged in said transverse direction under the influence of gravity to bear against a side of the adjacent guiding member, each guiding member consisting of a thin narrow guide which extends from a point adjacent to the article receiving end to a point adjacent to the article discharging end of said surface each, said guide composing substantially vertical sides one of which is higher than the other and a convex upper surface, and means for adjusting the transverse spacing of said guiding members on said surface.

References Cited in the file of this patent

UNITED STATES PATENTS

| 791,243 | Carlson | May 30, 1905 |
| 2,205,106 | Paterson | June 18, 1940 |
| 2,596,228 | Fletcher | May 13, 1952 |

FOREIGN PATENTS

| 531,700 | Great Britain | Jan. 9, 1941 |